No. 807,016. PATENTED DEC. 12, 1905.
J. H. BURNS.
CONVEYER.
APPLICATION FILED OCT. 22, 1904.
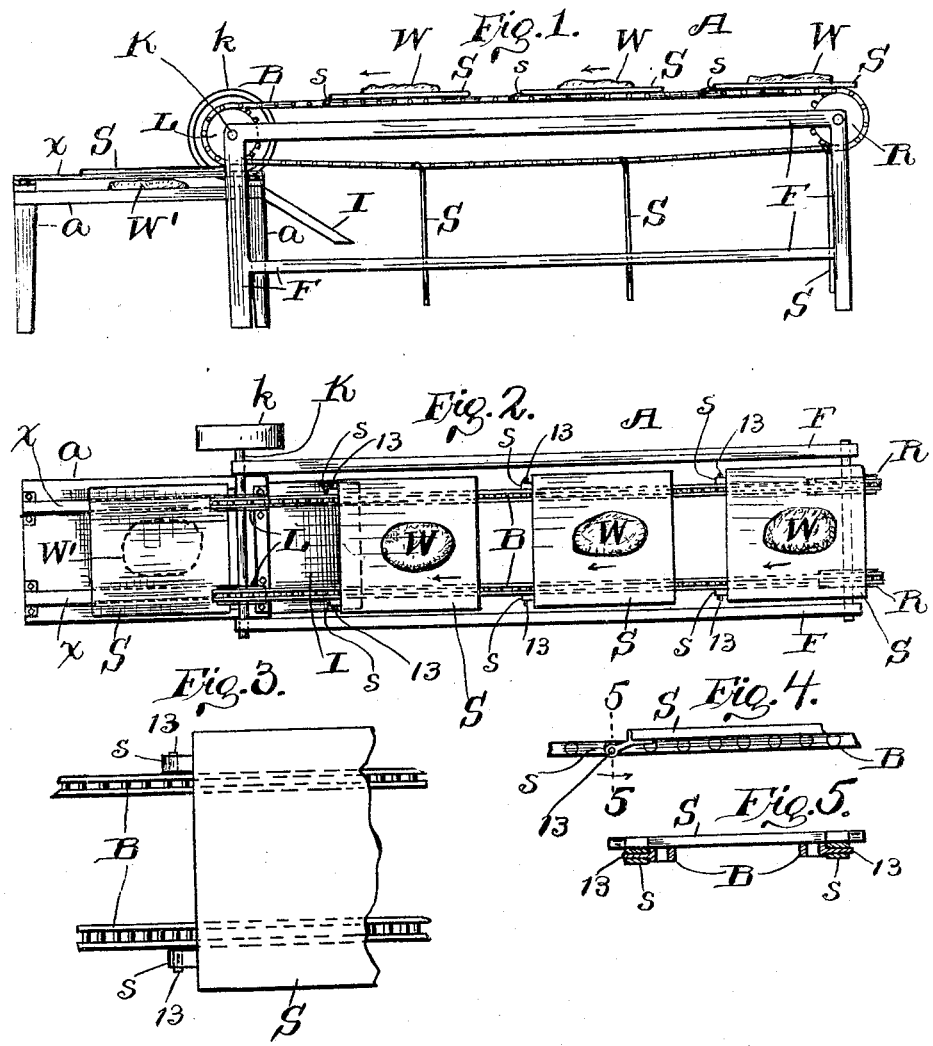
WITNESSES:
Daniel E. Daly.
Victor C. Lynch.
INVENTOR
Joseph H. Burns
BY
his ATTORNEYS

UNITED STATES PATENT OFFICE.

JOSEPH H. BURNS, OF CLEVELAND, OHIO.

CONVEYER.

No. 807,016.  Specification of Letters Patent.  Patented Dec. 12, 1905.

Application filed October 22, 1904. Serial No. 229,641.

*To all whom it may concern:*

Be it known that I, JOSEPH H. BURNS, a citizen of the United States of America, residing at Cleveland, in the county of Cuyahoga and State of Ohio, have invented certain new and useful Improvements in Conveyers; and I hereby declare the following to be a full, clear, and exact description of the invention, such as will enable others skilled in the art to which it pertains to make and use the same.

This invention relates to an improved conveyer instrumental in the formation of the upper surface of a table and employed in the conveying from the said table of a layer of dough or other plastic material or other object to be operated upon at one side upon the said table to and over another table and depositing the said layer of material or object down side up on the last-mentioned table to expose the opposite side of the said layer or object for the purpose of permitting the said layer or object to be operated upon at the last-mentioned side.

With this object in view and to the end of realizing other advantages hereinafter appearing this invention consists in certain features of construction and combinations of parts hereinafter described, and pointed out in the claims.

In the accompanying drawings, Figure 1 is a side elevation showing the application of a conveyer embodying my invention. Fig. 2 is a top plan relative to Fig. 1. Fig. 3 is a top plan, partly in section, of a portion of the conveyer; and Fig. 4 is a side elevation of the said portion of the conveyer. Fig. 5 is a vertical section on line 5 5, Fig. 4, looking in the direction indicated by the arrow. Figs. 3, 4, and 5 are drawn on the same scale and on a larger scale than Figs. 1 and 2.

My improved conveyer preferably comprises two endless chains B, which are parallel and arranged a suitable distance apart horizontally. The conveyer is provided with aprons S, which are arranged a suitable distance apart longitudinally of the chains B and are wide enough and arranged, as required, to render them capable of resting on both chains and participate in forming the upper surface of the table A, which comprises the said conveyer. The chains B are therefore provided at the outer side, as already indicated, with aprons S, which are spaced, preferably, equidistantly and arranged longitudinally of the said conveyer.

The chains B at the delivering end of the table A lead over diametrically-corresponding sprocket-wheels L, which are operatively mounted on a horizontal shaft K, arranged transversely of the table A and supported from the framework F of the said table. The shaft K is operatively provided with a driving-pulley $k$, to which power is applied in any approved manner.

Each apron S is horizontally pivoted at its forward end only to and transversely of the conveyer comprising the said apron. The pivotal attachment between each apron S and the chains B comprises, preferably, two ears $s$, with which the forward end of the apron is provided adjacent opposite side or longitudinal edges, respectively, of the apron, which ears are arranged with the chains between them and in line endwise and loosely embrace correspondingly-arranged cylindrical pins or members 13, projecting laterally and outwardly from the chains, as shown very clearly in Figs. 3, 4, and 5. It will be observed, therefore, that each apron S is capable of being swung in a vertical plane, as will hereinafter more clearly appear.

A chunk of dough or other plastic material or any object to be operated upon or treated is placed upon an apron S as the said apron during the actuation of the conveyer of the table A moves toward the delivering end of the said table. Figs. 1 and 2 illustrate layers W of dough or other plastic material upon aprons of the conveyer of the table A, which layers are shown moving toward the delivering end of the said table, as indicated by arrows.

The aprons S, being composed of a sheet of rubber of suitable thickness or a sheet composed of layers of rubber or leather and canvas or other closely-woven textile fabric, are flexible and yet stiff enough to render them capable of swinging upwardly from over the delivering end of the table A during the passage of the said aprons around the sprocket-wheels L.

The chains B at the receiving end of the said table lead over corresponding sprocket-wheels R, which (see Figs. 1 and 2) are arranged in line axially and suitably supported from the framework F.

By the construction hereinbefore described it will be observed that an apron S is readily removed from the chains B by pressing the said chains toward each other far enough to free the ears $s$ of the said apron from the engaging pins or members 13 of the chains.

A table $a$ is arranged adjacent to the delivering end of the table A, with the top of the table $a$ arranged below the upper and feeding portion of the conveyer of the table A.

The relative arrangement of the parts is such that a laden apron S of the conveyer of the table A will in turning over during its passage around the sprocket-wheels L deliver the load from the said apron onto the table $a$.

Figs. 1 and 2 illustrate the delivery of a layer W' of dough or other plastic material from the conveyer of the table A onto the table $a$.

Obviously the aprons of the conveyer of the table A in swinging from over the said conveyer toward and over the table $a$ overturn their load—a layer of plastic material in the case illustrated—depositing the said layer onto the table $a$ so that the opposite side of the said layer will be exposed upon the said table $a$ for the purpose of enabling an operation upon or treating of the said layer at the said last-mentioned side.

To prevent the aprons S from flapping against the top of the table $a$ during the delivery of a layer of plastic material or other object to the table $a$ from the table A, the table $a$ (see Figs. 1 and 2) is provided over its top with a rack which is mounted upon the said table in any approved manner and comprises two parallel bars or members $x$, arranged a suitable distance above the top of the table $a$, but below the upper or feeding portion of the conveyer of the table A. The bars or members $x$ are arranged horizontally and a suitable distance apart laterally and at opposite sides, respectively, of the load-receiving portion of the top of the table $a$. In other words, the bars or members $x$ are arranged in such position relative to the tables A and $a$ that each apron S shall upon swinging from over the table A flap against the said bars or members $x$, so that any material or object conveyed by the said apron shall be overturned and deposited between the said members $x$ onto the top of the table $a$. It will be observed, therefore, that the arrangement of the parts is such that a layer of plastic material or other object operated upon or treated during the feeding of the said material or object by the conveyer of the table A is delivered from the said table onto the table $a$, and each apron S upon striking against the bars or members $x$ of the rack mounted upon the table $a$ is during the actuation of the conveyer of the table A removed from over the said bars or members $x$ adown an incline I, with which the table $a$ is provided and which extends from the top of the table $a$ downwardly in under and longitudinally of the conveyer of the table A.

What I claim is—

1. A conveyer comprising two parallel chains arranged side by side and a suitable distance apart laterally and aprons spaced longitudinally of the chains and wide enough to overlap and arranged to rest upon both chains and attached at their forward ends only and removably to the chains, which aprons are detached by pressing the chains toward each other at the forward ends of the aprons.

2. A conveyer comprising two chains arranged side by side and a suitable distance apart and provided with projecting members spaced longitudinally of the chains, and aprons wide enough and arranged to rest upon both chains, which aprons are provided at their forward ends with ears or members loosely embracing and removable from the aforesaid projecting members of the chains.

3. An endless conveyer comprising two parallel endless chains arranged side by side and a suitable distance apart and provided with projecting members spaced longitudinally of the chains, and aprons wide enough and arranged to rest upon both chains, which aprons are provided at their forward ends with ears or members journaled upon the aforesaid projecting members of the chains.

4. A conveyer comprising two chains arranged side by side and a suitable distance apart, with each chain provided with horizontally-arranged projecting members spaced longitudinally of the chains and arranged in line endwise with the different projecting members respectively of the other chain, and aprons wide enough and arranged to rest upon both chains, and each apron being provided at its forward end with two horizontally-arranged ears or members arranged in line endwise and journaled upon one of the aforesaid projecting members of the different chains respectively, and the chains having enough slack to render them capable of being bent laterally far enough to disengage any apron from the engaging projecting members of the chains.

5. A conveyer comprising two endless chains arranged side by side and a suitable distance apart laterally, with each chain provided with projecting members spaced longitudinally of the chain, with the projecting members of each chain arranged in line endwise with and projecting laterally and away from the different projecting members respectively of the other chain, and aprons wide enough and arranged to rest upon both chains, and each apron being provided at its forward end with two ears or members arranged in line endwise and journaled upon one of the aforesaid projecting members of the different chains respectively, and the chains having enough slack to render them capable of being pressed toward each other to detach an apron.

6. An endless conveyer comprising two parallel endless chains arranged side by side and a suitable distance apart, and flexible aprons arranged and wide enough to rest upon both chains, and each apron and each chain being provided at the forward end of the apron with mutually-engaging ears and projecting members arranged as required to render the said apron capable of swinging in a vertical plane, and the chains having enough slack to render them capable of being bent laterally far enough to disengage the aforesaid mutually-engaging ears and projecting members.

In testimony whereof I sign the foregoing specification, in the presence of two witnesses, this 15th day of October, 1904, at Cleveland, Ohio.

JOSEPH H. BURNS.

Witnesses:
C. H. DORER,
B. C. BROWN.